(12) United States Patent
Ohnishi (10) Patent No.: US 7,302,649 B2
(45) Date of Patent: Nov. 27, 2007

(54) OPERATION METHOD FOR PROCESSING DATA FILE

(75) Inventor: Akinori Ohnishi, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 396 days.

(21) Appl. No.: 09/809,095

(22) Filed: Mar. 16, 2001

(65) Prior Publication Data

US 2001/0024212 A1 Sep. 27, 2001

(30) Foreign Application Priority Data

Mar. 24, 2000 (JP) ............................ 2000-084768

(51) Int. Cl.
*G06F 3/048* (2006.01)

(52) U.S. Cl. .................. 715/838; 715/858; 715/801; 715/810; 715/825; 715/769; 715/837

(58) Field of Classification Search ............... 345/838, 345/473, 858, 799, 801, 810, 825, 769, 837; 715/838, 858, 799, 801, 810, 825, 769, 837
See application file for complete search history.

(56) References Cited

U.S. PATENT DOCUMENTS

| | | | | |
|---|---|---|---|---|
| 5,392,389 A | * | 2/1995 | Fleming ..................... | 345/769 |
| 5,598,524 A | * | 1/1997 | Johnston et al. ............ | 345/769 |
| 5,611,060 A | * | 3/1997 | Belfiore et al. ............. | 345/819 |
| 5,706,457 A | * | 1/1998 | Dwyer et al. ............... | 715/835 |
| 5,727,174 A | * | 3/1998 | Aparicio et al. ............ | 345/837 |
| 5,745,112 A | * | 4/1998 | Hirose ........................ | 345/769 |
| 6,097,389 A | * | 8/2000 | Morris et al. ............... | 345/804 |
| 6,571,271 B1 | * | 5/2003 | Savitzky et al. ............ | 709/200 |

FOREIGN PATENT DOCUMENTS

| | | |
|---|---|---|
| JP | 6-19669 | 1/1994 |
| JP | 10-247136 | 9/1998 |
| JP | 2000-035842 | 2/2000 |
| JP | 2000-075984 | * 3/2000 |

OTHER PUBLICATIONS

Yabuta, Oriya; "Windows 95 wo browser kankaku de tsukau"; pp. 306-310. "Nikkei Pasocon", vol. 309; Mar. 23, 1998, by Nikkei Business Publications Inc.

(Continued)

*Primary Examiner*—Kristine Kincaid
*Assistant Examiner*—Peng Ke
(74) *Attorney, Agent, or Firm*—Nixon & Vanderhye, PC (57) ABSTRACT

In an operation method for processing data file of the present invention, reduced-size images and file icons of small area associated with the reduced-size images are displayed in pairs at predetermined interval between a reduced-size image and a file icon in each pair, and at least the data file is processed with a function as selected or the display position of the reduced-size image is changed by performing drag-and-drop operations on the file icons instead of performing a drag-and-drop operation on the reduced-size image directly as in the conventional method. According to the foregoing arrangement of the present invention, the reduced-size image can be displayed without reducing the size even while a drag-and-drop operation is being performed, and it is therefore possible to identify each data file based on the reduced-size image.

33 Claims, 5 Drawing Sheets

OTHER PUBLICATIONS

Office Action dated Oct. 4, 2005 in Japanese Patent Application No. 2000-084768 and English translation thereof.

Yabuta, Oriya; "*Windows 95 wo browser kankaku kankaku de tsekau*"; pp. 306-310. "*Nikkei Pasocon*", vol. 309; Mar. 23, 1998, by Nikkei Business Publications Inc.

* cited by examiner

OPERATION METHOD FOR PROCESSING DATA FILE

FIELD OF THE INVENTION

The present invention generally relates to an operation method for processing data files using icons which enables a GUI (Graphical User Interface) in an image processing apparatus.

BACKGROUND OF THE INVENTION

Conventionally, in image processing apparatuses, operations using icons which enable excellent GUIs have been available. In recent years, these image processing apparatuses more and more deal wit data files of large volume such as images with their improvements in processing power. For example, Japanese Unexamined Patent Publication No. 19669/1994 (Tokukaihei 6-19669 published on Jan. 28, 1994) discloses a typical prior art operation method for processing data files of large volume. In this method, reduced-size images called "thumbnail" images, which allow a user to identify the contents of data files, are displayed, and using the reduced-size images as icons, a function as desired such as print, transmission, etc., is selected by performing a drag-and-drop operation on a reduced-size image directly, and the data file is processed with the selected function.

According to the foregoing method of processing data flies, it is possible for a user to ascertain the contents or intended use of the data files based on the reduced-size images without the need of opening each data file on the screen using application software, and therefore an improved operability can be achieved.

However, the foregoing conventional methods have presented the user with several difficulties when processing a large number of data files. For example, each icon of reduced-size image becomes too small and the image quality becomes too low for a user to see the details, and it is therefore difficult for the user to identify the contents of the original data file. In response, each icon of reduced-size image may be displayed in larger size. However, in this case, other problems arise. For example, all the icons of reduced-size images cannot be displayed at one time, or an icon may be positioned over some of the function icons while a drag-and-drop operation is being performed, which presents a user with difficulties in selecting a function icon as desired. Furthermore, when. adopting larger size icons of reduced-size images, a larger amount of data needs to be processed for a display in a drag operation.

SUMMARY OF THE INVENTION

It is an object of the present Invention to provide an operation method for processing data files which permits drag-and-drop operations to be performed with ease while ensuring the visibility of reduced-size images.

In order to achieve the above object, an operation method for processing data files of the present invention, is characterized by including the steps of:

(a) displaying a reduced-size image for use in identifying contents of a data file, and a file icon associated with the reduced-size image in pair at a predetermined interval between them, the file icon having a smaller area than the reduced-size image; and (b) performing at least either one of the operations of i) selecting a function to be applied to the data file and ii) changing a display position of the reduced-size image by a drag-and-drop operation on the file icon.

According to the foregoing arrangement, a plurality of reduced-size images (thumbnail images) of data files are displayed on a screen, and file icons respectively associated with the reduced-size images are displayed in the proximity of the corresponding reduced-size images. With this arrangement, a function to be applied to the data file is selected or the display position of the reduced-size image is changed by dragging-and-dropping a file icon onto a function icon representing a function as desired such as print, facsimile transmission, E-Mail transmission, etc., or to a target display position instead of performing a drag-and-drop operation directly as in the conventional method, thereby activating the function to be applied to the data file or changing the display position.

In the foregoing method, even while the drag-and-drop operation is being performed, the reduced-size images can be displayed in the same size as in the normal state, and it is therefore possible for user to identify the contents of the data files based on the reduced-size images. Furthermore, the foregoing file icons to be dragged-and-dropped are displayed substantially in the same size as the function icons representing respective functions. It is therefore possible for user to confirm the dropped position with ease, and an operation error is less likely to occur as compared to the case of performing a drag-and-drop operation directly on the reduced-size image.

For a fuller understanding of the nature and advantages of the invention, reference should be made to the ensuing detailed description taken in conjunction with the accompanying drawings.

DESCRIPTION OF THE EMBODIMENTS

The following will explain one embodiment of the present invention with reference to Figures. An operation method for processing data file in accordance with the present embodiment is adopted in an information processing apparatus as software for the GUI described earlier.

Figure 1A:
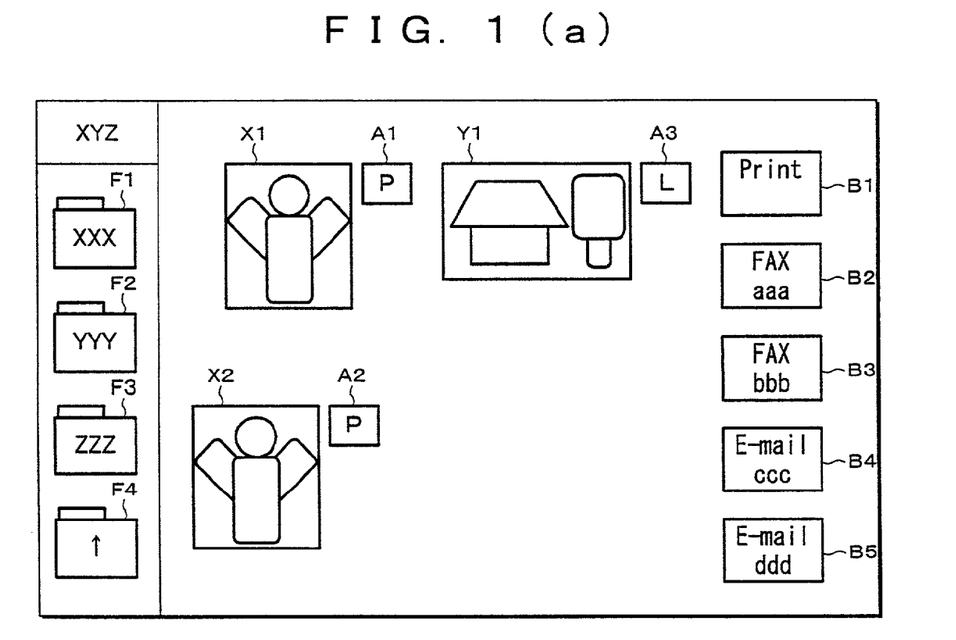
FIG. 1(a) is an explanatory view of an operation method for processing a data file in accordance with one embodiment of the present invention.

As illustrated in FIG. 1(a), upon activating this software for processing data files, the information processing apparatus displays file folders F1, F2, F3 and F4 for data files at the left end side of a screen.

With this screen, for example, assume a user selects two data file icons as desired from the data folder F1 by clicking, and performs drag-and-drop operations of these icons ante screen. Then, reduced-size images X1, X2 corresponding to the selected data files are displayed respectively at positions where these icons are dropped. In this state, file icons A1, A2 corresponding to the reduced-size images X1, X2 are displayed respectively at predetermined distance from the reduced-size images X1 and X2.

Similarly, assume a user selects a data file icon as desired from the data folder F2 by clicking, and performs a drag-and-drop operation of this icon on the screen. Then, a reduced-size image Y1 corresponding to the selected data file is displayed, in the meantime, the file icon A3 corresponding to the reduced-size image Y1 is displayed.

On the right end side of the screen, function icons B1, B2, B3, B4 and B5 indicative of respective functions are displayed substantially in the same size as the file icons A1, A2 and A3. The examples of the functions represented by the function icons include: print function, facsimile transmission function, E-Mail transmission function, etc.

Figure 1B:
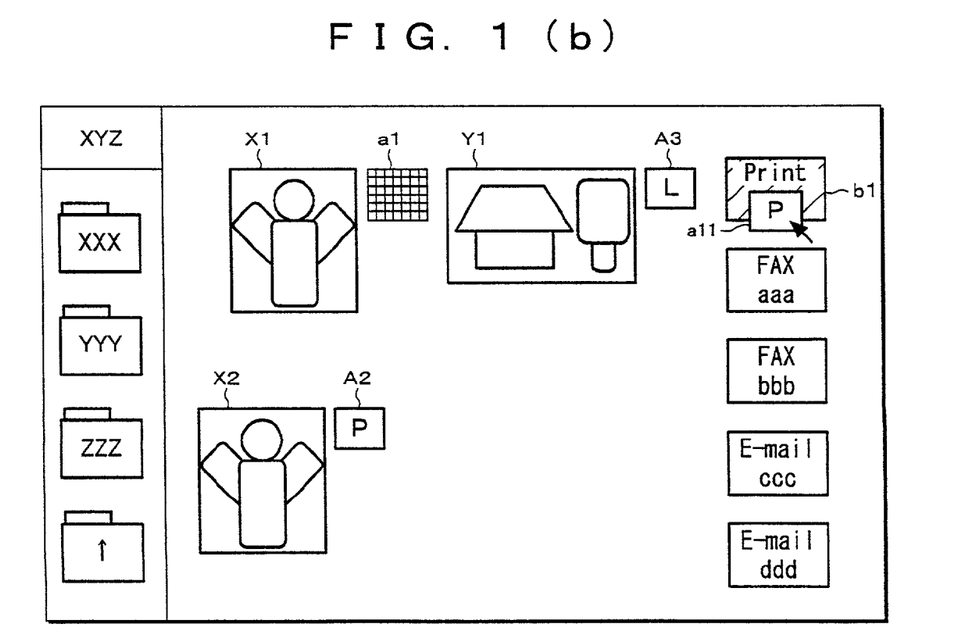
FIG. 1(b) is an explanatory view of the operation method for processing the data file of FIG. 1(a).

As illustrated in FIG. 1(b), for example, when clicking the file icon A1, the file icon A1 is changed to a highlighted icon a1 such as an icon in different color, a flashing icon, etc., to call attention to this activated icon. Then, the file icon A1 is dragged to the position indicated by a file icon a11. Here, by performing a drag operation on the file icon A1, the corresponding reduced-size image X1 is moved together with the file icon A1. For simplicity in illustration, the reduced-size image X1 is illustrated in FIG. 1(b) at original display position, i.e., the position before being moved. Then, the file icon A1 is dragged and dropped onto the function icon B1. In response, the file icon B1 is changed to a highlighted icon b1 such as an icon in different color or a flashing icon, etc. Then, a print function represented by the selected function icon B1 is activated.

Here, for the layout of the display, the reduced-size image X1 is preferably displayed on the left side of the file icon A1, to be the opposite side of a moving region of the file icon where the file icon A1 is moved to the display positions of the function icons B1 to B5. With this arrangement, when the file icon A1 is moved to the display position of the function icons B1 to B5, i.e., to the right in the Figure, the associated reduced-size image X1 is also moved following the file icon A1 on its left side. Therefore, the likelihood of such problem that the reduced-size image is overlapped with some of the file icons B1 to B5 during its movement can be eliminated, and it is therefore possible to ensure the visibility of both the reduced-size image X1 and the function icons B1 to B5 even when the reduced-size image is being moved.

Figure 2:
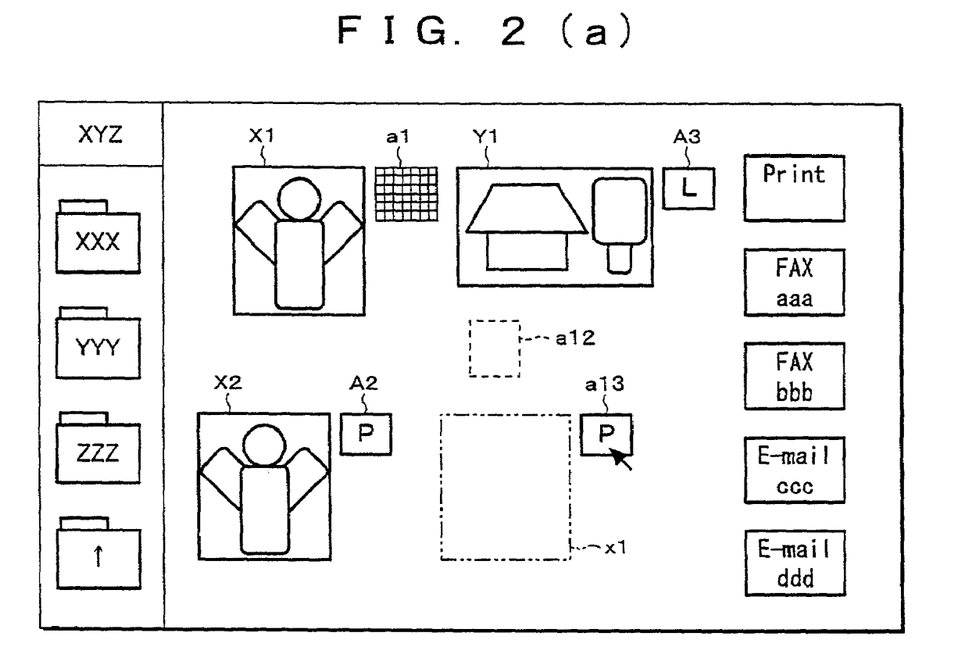
FIG. 2(a) is an explanatory view of another operation method for processing the data file of FIG. 1(a).
FIG. 2(b) is an explanatory view which explains movements of a reduced-size image in the operation method for processing the data file of FIG. 2(a).

Further, while the drag operation on the file icon A1 is being performed at high speeds, i.e., at a predetermined speed or higher, as illustrated in FIG. 2(a), the file icon A1 being dragged is displayed as indicated by the file icon a12 in the Figure at position between the original position and a target drop position, and the reduced-size image X1 is fixed at its original display position. Thereafter, the drag speed of the file icon A1 is reduced as it approaches the target drop position; on the other hand, when the drag speed of the file icon A1 is reduced below the predetermined speed, i.e., almost in stoppage, a frame x1 in the same size as the reduced-size image X1 is displayed at a corresponding position of the file icon a13, i.e., a current display position of the file icon A1. Then, by dropping the file icon A1, the display position of the reduced-size image X1 is changed as illustrated in FIG. 2(a).

In FIG. 1(a) through FIG. 2(b), in the state where the highlighted file icon a1 at the original position, i.e., the position before being dragged has moved to a position more than a predetermined distance apart from the current position of the reduced-size image as indicated by the file icons a11, a12, a13, an icon return space (to be described later) is displayed. With this display, when the file icon a1 is dropped in the icon return space, the file icon a1 is moved back to its original display position without moving the associated reduced-size image X1.

Figure 3:
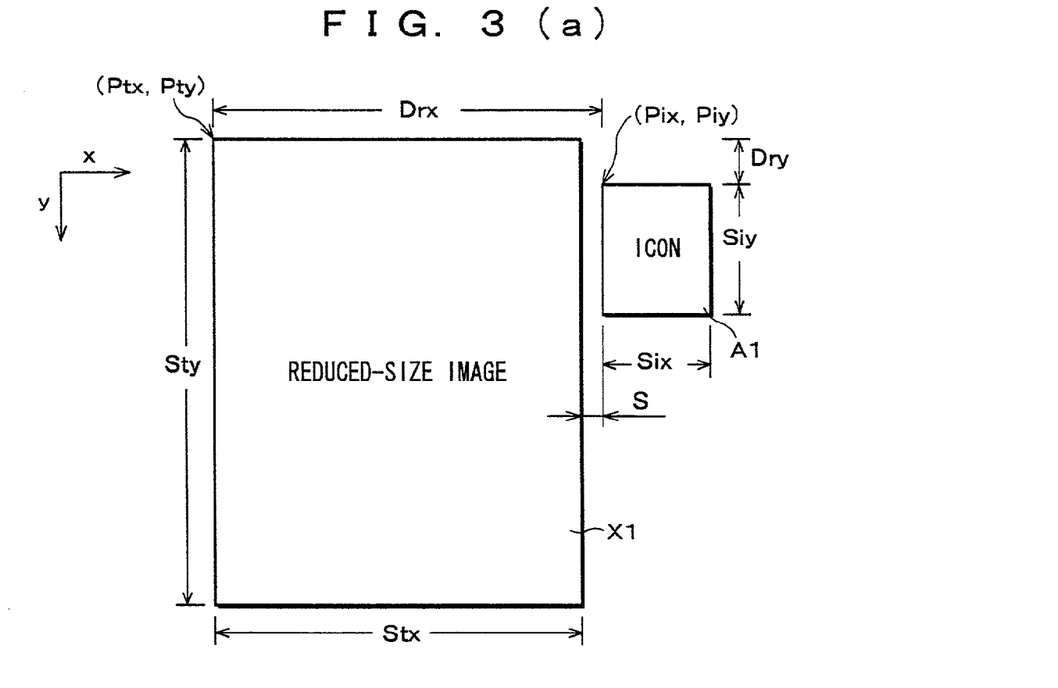
FIG. 3(a) is an explanatory view illustrating a relative position between a reduced-size image and a file icon in the operation method for processing the data file of FIG. 1(a).
FIG. 3(b) is an explanatory view illustrating a relative position between a reduced-size image and an icon return space in the operation method for processing the data file of FIG. 1(a).

The foregoing icon return space will be explained in details in reference to FIG. 3(a) and FIG. 3(b). As illustrated in FIG. 3(a), assume an interval in the x-axis direction between the right side of the reduced-size image X1 and the left side of the file icon A1 is a predetermined interval S, the coordinates of the upper left vertex of the reduced-size image are (Ptx, Pty), and the width and the height of the reduced-size image X1 are Stx and Sty, then the coordinates (Pix, Piy) of the upper left vertex of the file icon A1 being dragged are (Ptx+Stx+S, Pty+Dry). It is assumed in this example that the origin is located at the upper left position in the FIGS. 3(a) and 3(b), and Dry has a predetermined value.

It is further assumed that the width and the height of the file icon A1 before being dragged are Six and Siy respectively, then as illustrated in FIG. 3(b), an icon return space C is displayed in size of 3Six/2 (width)×3Siy/2 (height) at a position where the upper left vertex is located at coordinates (Ptx+Stx+S, Pty+Dry−Siy/4).

Namely, an interval S' between the right side of the reduced-size image X1 and the left side of the icon return space C is not changed from the predetermined interval S between the right side of the reduced-size image X1 and the left side of the file icon A1. The ion return space C is displayed in 1.5 times larger both in width and height than the file icon A1. With this arrangement, the file icon A1 being dragged can be dropped within the icon return space C with ease, and the file icon A1 can be moved to the original position with ease.

Here, the icon return space C is preferably displayed in noticeable pattern so that the reduced-size image X1 corresponding to the file icon A1 being dragged can be identified with ease.

Figure 4:
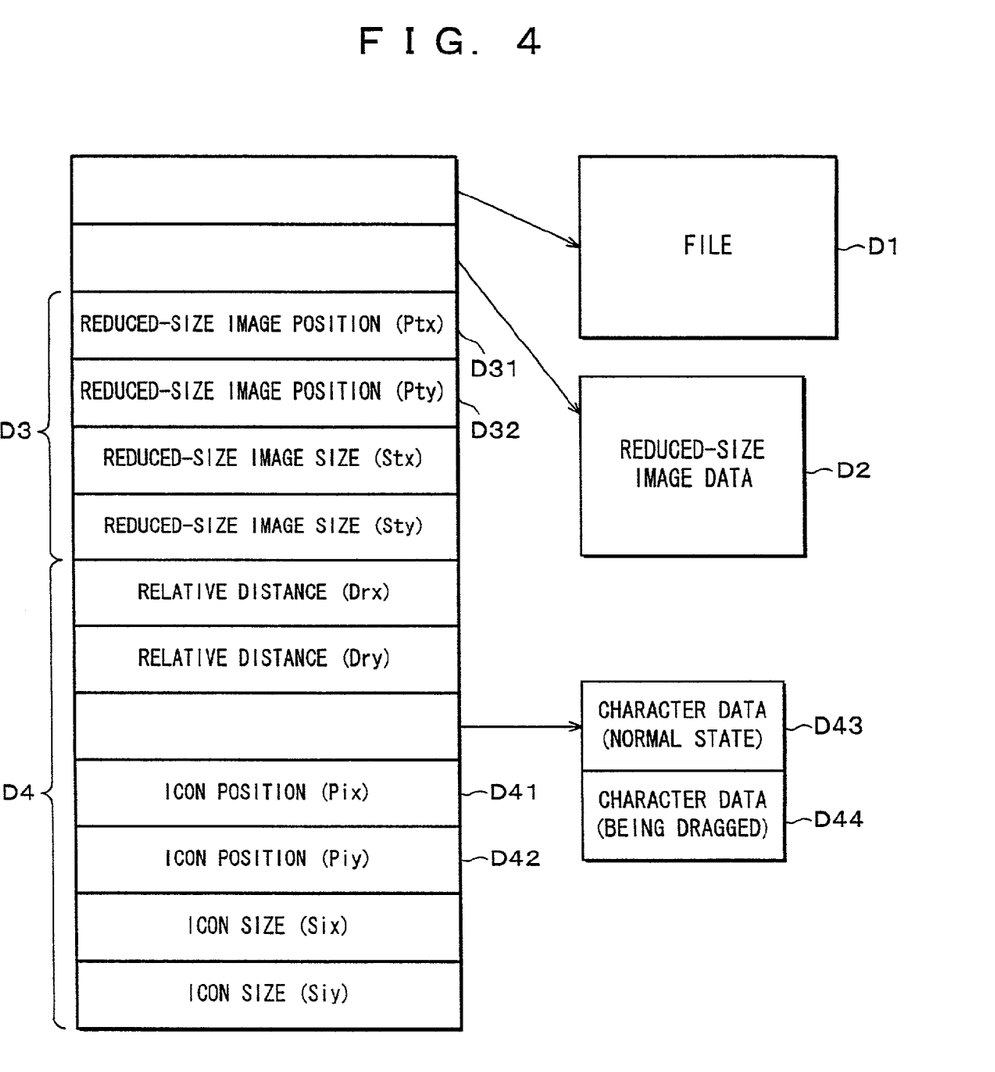
FIG. 4 illustrates an example of contents of data stored in graphic memory of the information processing apparatus when activating software for processing a data file.

FIG. 4 illustrates an example of contents of information stored in memory of the information processing apparatus when activating the software for processing the data file. In this memory, stored are main data D1 of the file folders F1 to F4, the main data D2 of reduced-size images corresponding to the data files as selected, position indicative data D3 of the reduced-size images, and the data D4 of the file icons corresponding to the reduced-size images.

For example, when the display position of the reduced-size image X1 is changed as illustrated in FIG. 2(b), the image position indicative data D31, D32 representing the coordinates (Ptx, Pty) of the upper left vertex of the reduced-size image X1 are changed in the position indicative data D3 of the reduced-sized image X1. On the other hand, the icon position indicative data D41, D42 representing the coordinates (Pix, Piy) of the upper left vertex of the file icon A1 are changed in the data D4 on the file icon A1 corresponding to the reduced-size image X1. The character data D43 of the file icon A1 is changed to a highlighted character data D44 of the file icon a1 by changing its color or flashing the icon during the drag operation.

Figure 5:
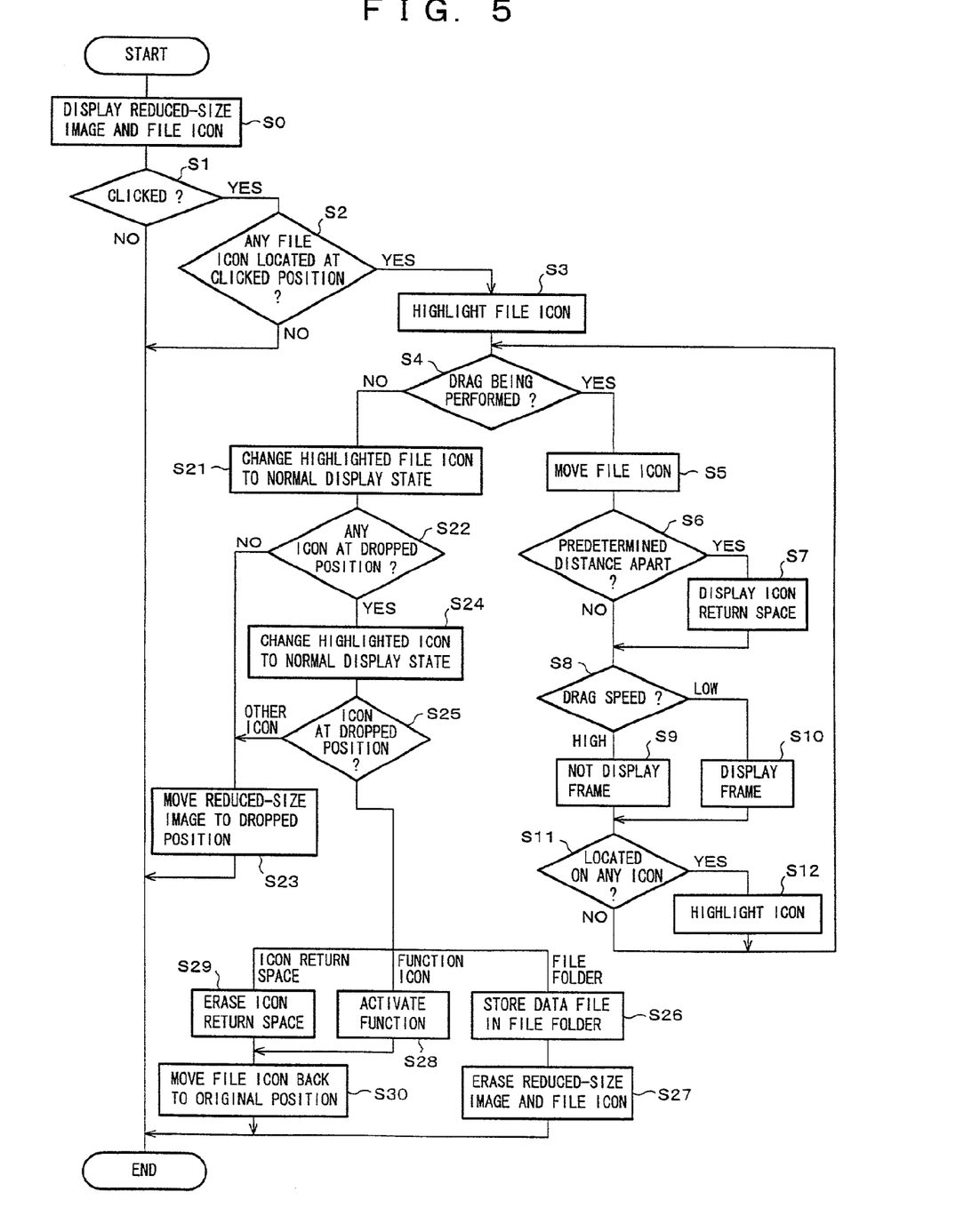
FIG. 5 is a flowchart which explains the operation method for processing the data file of FIG. 1(a).

FIG. 5 is a flowchart explaining the foregoing operation for processing the data file of the present embodiment. First, in STEP 0, a reduced-size image for use in identifying the contents of the data file, and a file icon associated with the reduced-size image are provided as a pair with a predetermined interval between tern, the file icon having a smaller area then the reduced-size image. In STEP 1, it is determined whether or not a click has been made. If it is determined that the click has not been made, the process is terminated. On the other hand, if it is determined that the mouse click has been performed, the process proceeds to STEP 2 where it is determined if a file icon is displayed at a clicked position. If not in STEP 2, the process is terminated, On the other hand, if it is determined that g file icon is displayed at the clicked position, the process proceeds to STEP 3 where the clicked file icon is changed to a highlighted file icon such as an icon in different color or a flashing icon. In STEP 4, it is determined if the mouse button is held depressed, i.e., a drag operation is being performed. If it is determined that the drag operation is being performed, the process proceeds to STEP 5. On the other hand, if it is determined that the drag operation is not being performed, the process proceeds to STEP 21.

In STEP 5, the display position of the file icon is changed. Then, in STEP 6, it is determined if the file icon has moved to a position more than a predetermined distance apart from the position at which the reduced-size image corresponding to the file icon is displayed. If so in STEP 6, the process proceeds to STEP 7 where an icon return space is displayed at original position of the file icon, i.e., the position before being dragged. Then, the process proceeds to STEP S8. On the other hand, if not in STEP 6, the process proceeds to STEP 8 directly.

In STEP 8, it is determined if a drag speed of the file icon is at a predetermined speed or higher. If it is determined that the drag speed of the file icon is at the predetermined speed or higher in STEP 8, the process proceeds to STEP 9 where a frame x1 is not displayed. On the other hand, if it is determined that the drag speed of the file icon is lower than the predetermined speed, i.e., the drag operation is almost in stoppage as it approaches the target drop position, the process proceeds to STEP 10 where the frame x1 is displayed.

From both of the foregoing STEP 9 and STEP 10, the process proceeds to STEP 11 where it is determined if the file icon being dragged is placed over another icon. If so, the process proceeds to STEP 12 where the overlapping icon is highlighted by changing its color or by flashing the activated icon, and then the process goes back to STEP 4. On the other hand, if it is determined in STEP 11 that the file icon being dragged is not overlapped with another icon, the process goes back to STEP 4 directly.

When the foregoing drag operation is stopped, i.e., when a drop operation is performed, the process proceeds to STEP 21. In STEP 21, the highlighted file icon is changed back to the normal display state. Then, in STEP 22, it is determined if the file icon is overlapped with any icon. If not, the reduced-size image is moved to the position corresponding to the dropped position of the file icon in STEP 23, and the process is terminated.

On the other hand, in STEP 22, if the file icon being dropped is overlapped with another icon, the highlighted icon is changed back to the normal display state in STEP 24. Then, in STEP 25, the kind of the overlapping icon of the file icon at the dropped position is determined.

If it is determined in STEP 25 that the overlapping icon is any one of the file folders F1 to F4, the data file corresponding to the file icon at the dropped position is stored in the file folder in STEP 26. Then, the dropped file icon and the corresponding reduced-size image are deleted in STEP 27.

On the other hand, if it is determined in STEP 25 that the overlapping icon at the dropped position is any one of the function icons B1 to B5, the function represented by that function icon is activated in STEP 28. Then, the process is terminated. The overlapping icon at the dropped position may be an icon return space. In this case, the icon return space is deleted in STEP 29, and the file icon is moved back to its original display position, i.e., the position before being dragged in STEP 30. Then, the process is terminated.

As described, according to the operation method for processing data file in accordance with the present embodiment, file icons A1, A2 and A3 are displayed at positions in the proximity of the corresponding reduced-size images X1, X2 and Y1 respectively which allow the user to identify the contents of the data files stored in the data folders F1 to F4. Further, a drag-and-drop operation is performed on the file icons A1, A2 and A3 instead of performing drag-and-drop operations on the reduced-size images X1, X2 and Y1 directly.

According to the foregoing arrangement, even while the drag-and-drop operation is being performed, the reduced-size images X1, X2 and Y1 can be displayed in the same size as in the normal state, and it is therefore possible to identify respective data files based on the reduced-size images X1, X2 and Y1.

Moreover, the file icons a11, a12 and a13 are displayed substantially in the same size as the function icons B1 to B5 representing respective functions. Therefore, compared with the case of performing drag-and-drop operation of the reduced-size images X1, X2 and Y1 directly, the dropped position can be confirmed with ease, and an operation error is less likely to occur.

According to the foregoing operation method, during the drag operation on the file icon at high speeds to the target drop position, only the small size file icon a12 is displayed, and the reduced-size image X1 is fixed at its original display position. Thereafter, the drag speed of the file icon is reduced as it approaches the target drop position, and when the drag speed of the file icon is reduced to below the predetermined speed, i.e., almost in stoppage, a frame in the same size as the reduced-size image X1 is displayed at a corresponding position of the file icon a13, i.e., a current display position of the file icon A1.

In the drag operation on the file icon A1, when the file icon a11, a12, a13 has moved to a position more than a predetermined distance away from the corresponding reduced-size image X1, an enlarged icon return space C is displayed at or in the proximity of the original position of the file icon a11, a12 and a13 at the predetermined fixed interval S from the reduced-size image. With this display, when the file icon A1 is dropped in the icon return space C, the file icon a11, a12, a13 is moved back to its original display position without moving the associated reduced-size image X1. In this way, it is possible for the user to terminate the operation if desired only by moving the icon a11, a12, a13 back to its original display position without moving the associated reduced-size image X1. In this case, by displaying the icon return space C in the outstanding pattern, the reduced-size image X1 corresponding to the file icon A1 being dragged can be identified with ease.

The operation method for processing data file of the present invention may be arranged such that while the file icon is being dragged at a predetermined speed or higher, the display position of the reduced-size image is fixed at its current display position. On the other hand, when the drag speed is reduced to below the predetermined speed, a frame in size of the reduced-size image is displayed.

According to the foregoing structure, during the high-speed drag operation on the file icon to the desired dropped position, only a file icon of a small area is displayed. Further, the frame is displayed only when a user performs a precise positioning of the drop position to allow him to recognize the size of the reduced-size image. It is therefore possible to reduce an amount of data to be processed for a preparation of display image as compared to the case of performing a drag operation on the reduced-size image directly which is larger in size than the file icon, and also possible to achieve visibility.

The operation method for processing data files of the present invention may be arranged such that when the file icon is dropped at a position where the function icon representing the kind of the function to be applied to the data file is not displayed, the display position of the corresponding reduced-size image is changed by moving it to a position at a predetermined interval from the dropped position of the file icon.

According to the foregoing structure, the reduced-size image is not displayed during the movement of the file icon, and the reduced-size image is displayed only after the drop position is determined. It is therefore possible to change the display position of the reduced-size image using small amount of data.

The operation method for processing data file of the present invention may be arranged such that the reduced-size image is displayed in an area on the opposite side of a moving region of the file icon where the file icon is moved to a function icon.

According to the foregoing arrangement, the reduced-size image and the function icon do not overlap one another, and it is therefore possible to ensure the visibility of the reduced-size image and the function icon even while the reduced-size image is being moved.

The operation method for processing data file of the present invention may be arranged such that when the file icon has moved to a position more than a predetermined distance apart from the corresponding reduced-size image, an icon return space is displayed at or in the proximity of the original display position of the file icon, so that the icon return space and the reduced-size image are positioned at a predetermined interval between them.

According to the foregoing structure, by confirming the icon return space, the reduced-size image corresponding to the file icon being dragged can be identified with ease.

The operation method for processing data file of the present invention may be arranged such that when the file icon is dropped in the icon return space, the file icon is moved to the original position without moving the corresponding reduced-size image.

According to the foregoing structure, when the user desires to terminate the operation, the file icon can be moved back to its original display position without moving the associated reduced-size image.

The operation method for processing data file of the present invention may be arranged such that the icon return space is displayed in outstanding pattern.

According to the foregoing structure, the reduced-size image corresponding to the file icon being dragged can be identified with ease.

The data file to be processed by the operation method for processing the data file of the present invention include, for example, text data, document data for word processor, spreadsheet data, etc. The foregoing reduced-size image may be used as an image icon by further reducing the size.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. An operation method for processing data files, comprising:
   (a) displaying for each of one or more data flies a reduced-size image/file icon pair, wherein the reduced-size image/file icon pair for each of the one or more data files is displayed on a first area of a display area wherein the reduced-size image is for use in identifying the contents of the data file and the corresponding concurrently displayed file icon is spaced from, and has a smaller area than, the reduced-size image and wherein the display position of the file icon relative to the display position of the reduced-size image is predetermined to be the same for each of the reduced-size image/file icon pairs and wherein the reduced-size image/file icon pair for each of the one or more data files is displayed so that the reduced-sized image and the corresponding file icon do not overlap;
   (b) displaying one or more function icons on a second area of the display screen which is different than the first area of the display screen; and
   (c) performing at least either one of the operations of i) selecting a function to be applied to one of the data files and ii) changing a display position of one of the reduced-size images by a drag-and-drop operation on the corresponding file icon,
   wherein the reduced-sized image for each reduced-size image/file icon pair is displayed so that each file icon is between its corresponding reduced-size image and the second area of the display screen, and
   wherein in step (c), the reduced-size image is fixed at a current position while a drag operation on the file icon is being performed at a predetermined speed or higher; and, when the drag speed is reduced below the predetermined speed, a frame having the size of the reduced size image is displayed.

2. The operation method for processing data files as set forth in claim 1, wherein:
   in step (c), when the file icon is dropped at a position where no function icon representing a kind of a function to be applied to the data file is displayed, a display position of the corresponding reduced-size image is changed by moving the corresponding reduced-size image to a position at a predetermined interval from a dropped portion of the file icon.

3. The operation method for processing data files as set forth in claim 1, wherein:
   in step (c), when the file icon has moved to a position more than a predetermined distance apart from the corresponding reduced-size image, an icon return space is displayed at a predetermined fixed interval from the reduced-size image.

4. The operation method for processing data files as set forth in claim 3, wherein:
   in step (c), when the file icon is dropped in the icon return space, the file icon is moved back to its original display position without moving the associated reduced-size image.

5. The operation method for processing data files as set forth in claim 3, wherein:
the icon return space is formed in an outstanding pattern.
6. The operation method for processing data files as set forth in claim 3, wherein:
the icon return space is larger in size than the file icon.
7. The operation method for processing data files as set forth in claim 1, wherein:
a function icon is displayed with substantially the same size as the file icon when the file icon is displayed.
8. The operation method for processing data files as set forth in claim 1, wherein:
a display of one or both of a function icon and an icon return space is changed when the file icon overlaps the function icon when the file icon is dragged.
9. The operation method for processing data files as set forth in claim 3, wherein:
the icon return space is displayed in a different manner than the file icon when the file icon has moved to a position at a predetermined position from an original position.
10. The operation method for processing data files as set forth in claim 1, wherein:
the file icon is displayed adjacent to a side portion of the reduced-size image for each reduced-size image/file icon pair.
11. A method comprising:
generating a display that comprises a reduced-size image/file icon pair for each of one or more data flies, wherein the reduced-size image/file icon pair for each of the one or more data files is displayed on a first area of a display screen, wherein the reduced-size image permits an identification of the contents of the data file and the corresponding concurrently displayed file icon is smaller than, and spaced from, the reduced-sized image, wherein the display position of the file icon relative to the display position of the reduced-size image is predetermined to be the same for each of the reduced-size image/file icon pairs, and wherein the reduced-size image/file icon pair for each of the one or more data files is displayed so that the reduced-sized image and the corresponding file icon do not overlap;
moving one of the reduced-sized images from an original display position in response to user inputs supplied via an input device for moving the file icon corresponding to that reduced-size image from an original display position to another display position; and
processing one of the data files in accordance with a function in response to user inputs supplied via the input device for moving the file icon corresponding to that data file from an original display position to a function-invoking position on the display that invokes the function, wherein
the function-invoking position comprises a function icon displayed in a second area of the display screen, and the file icon for each of the reduced-size image/file icon pairs is displayed so that so that each file icon is between its corresponding reduced-size image and the second area of the display screen, and
wherein a frame representing the reduced-size image moves with the file icon corresponding to one of the data files if the file icon is moved at a speed less than a predetermined speed and the reduced-size image remains in its original position if the file icon is moved at a speed greater than the predetermined speed.
12. The method according to claim 11, wherein the user inputs for moving the file icon from its original display position to another display position comprise inputs for dragging-and-dropping the file icon.
13. The operation method for processing data files as set forth in claim 1, wherein the operation performed is selecting a function to be applied to one of the data files.
14. The method according to claim 12, wherein the reduced-size image is moved from its original position to a position adjacent to the position at which the file icon is dropped.
15. The method according to claim 11, farther comprising:
displaying a file icon return space when the file icon corresponding to one of the data files is moved more than a predetermined distance from its corresponding reduced-size image.
16. The method according to claim 11, wherein the one or more data files are displayed on a third area of the display screen which is opposite to the second area with the first area therebetween.
17. The method according to claim 15, further comprising:
returning the file icon back to its original display position if the file icon is moved to the file icon return space.
18. The method according to claim 15, wherein the file icon return space has a larger area than the file icon.
19. The method according to claim 11, wherein the user inputs for moving the file icon to the function-invoking position comprise inputs for dragging-and-dropping the file icon onto the function icon.
20. The method according to claim 19, wherein the function icon has substantially the same size as the file icons.
21. The method according to claim 11, wherein the function in accordance with which the data file is processed is selected from the group consisting of a printing function, a facsimile function, and an e-mail function.
22. An image processing system comprising:
a user input device; and
a processing system for generating a display that comprises a reduced-size image/file icon pair for each of one or more data files, wherein the reduced-size image/file icon pair for each of the one or more data files is displayed on a first area of a display screen, wherein the reduced-size image permits an identification of the contents of the data file and the corresponding concurrently displayed file icon is smaller than, and spaced from, the reduced-size image, wherein the display position of the file icon relative to the display position of the reduced-size image is predetermined to be the same for each of the reduced-size image/file icon pairs, and wherein the reduced-size image/file icon pair for each of the one or more data files is displayed so that the reduced-sized image and the corresponding file icon do not overlap;
wherein the processing system moves one of the reduced-sized images from an original display position in response to user inputs supplied via the input device for moving the file icon corresponding to that reduced-size image from an original display position to another display position
wherein the processing system processes one of the data files in accordance with a function in response to user inputs supplied via the input device for moving the file icon corresponding to that data fro from an original display position to a function-invoking position on the display that invokes the function,
wherein the function-invoking position comprises a function icon displayed in a second area of the display screen, and the file icon for each of the reduced-size image/file icon pairs is displayed so that so that each file icon is between its corresponding reduced-size image and the second area of the display screen, and wherein the reduced-size image for one of the data files is fixed at a current position while a drag operation on the corresponding file icon is being performed at a redetermined speed or higher; and, when the drag speed is reduced below the predetermined speed, a frame having the size of the reduced size image is displayed.

23. The image processing system according to claim 22, wherein the one or more data files are displayed on a third area of the display screen which is opposite to the second area with the first area therebetween.

24. A storage device for storing executable instructions for performing steps comprising:

generating a display comprising a reduced-size image/file icon pair for each of a plurality of data files, wherein the reduced-size image/file icon pair for each of the one or more data files is displayed on a first area of a display screen, wherein the reduced-size image for each data file permits an identification of the contents of the data file and the file icon for each data file is smaller than, and spaced from, the reduced-sized image to which the file icon corresponds wherein the display position of the file icon relative to the display position of the reduced-size image is predetermined to be the same for each of the reduced-size image/file icon pairs and wherein the reduced-size image/file icon pair for each of the one or more data files is displayed so that the reduced-sized image and the corresponding file icon do not overlap;

moving, one of the reduced-sized images from an original display position in response to user inputs supplied via an input device for moving the file icon corresponding to that reduced-size image from an original display position to another display position; and processing one of the data files in accordance a function ha response to user inputs supplied via the input device for moving the file icon corresponding to that data file from an original display position to a function-invoking position on the display that invokes the function, wherein the function-invoking position comprises a function icon displayed in a second area of the display screen, and the file icon for each of the reduced-size image/file icon pairs is displayed so that so that each file icon is between its corresponding reduced-size image and the second area of the display screen, and wherein the reduced-size image for one of the data files is fixed at a current position while a drag operation on the corresponding file icon is being performed at a predetermined speed or higher; and, when the drag speed is reduced below the predetermined speed, a frame having the size of the reduced size image is displayed.

25. The storage device according to claim 24, wherein the one or more data files are displayed on a third area of the display screen which is opposite to the second area with the first area therebetween.

26. A method comprising:

generating a display that comprises a reduced-size image/file icon pair for each of one or more data files, wherein the reduced-size image/file icon pair for each of the one or more data files is displayed on a first area of a display screen, wherein the reduced-size image permits an identification of the contents of the data file and the corresponding concurrently displayed file icon is smaller than, and spaced from, the reduced-sized image and wherein the display position of the file icon relative to the display position of the reduced-size image is predetermined to be the same for each of the reduced-size image/file icon pairs and wherein the reduced-size image/file icon pair for each of the one or more data files is displayed so that the reduced-sized image and the corresponding file icon do not overlap; and processing one of the data files in accordance with a function in response to user inputs supplied via the input device for moving the file icon corresponding to that data file from an original display position to a function-invoking position on the display that invokes the function, wherein the function-invoking position comprises a function icon displayed in a second area of the display screen, and the file icon for each of the reduced-size image/file icon pairs is displayed so that so that each file icon is between its corresponding reduced-size image and the second area of the display screen, and wherein the reduced-size image for one of the data flies is fixed at a current position while a drag operation on the corresponding file icon is being performed at a predetermined speed or higher; and, when the drag speed is reduced below the predetermined speed, a frame having the size of the reduced size image is displayed.

27. The method according to claim 26, wherein the function icon and the file icons are substantially the same size.

28. An image processing system comprising:

a user input device; and a processing system for generating a display that comprises a reduced-size image/file icon for each of one or more data files, wherein the reduced-size image/file icon pair for each of the one or more data files is displayed on a first area of a display screen, wherein the reduced-size image permits an identification of the contents of the data file and the corresponding concurrently displayed file icon is smaller than, and spaced from, the reduced-size image, wherein the display position of the file icon relative to the display position of the reduced-size image is predetermined to be the same for each of the reduced-size image/file icon pairs, and wherein the reduced-size image/file icon pair for each of the one or more data files is displayed so that the reduced-sized image and the corresponding file icon do not overlap;

wherein the processing system processes one of the data files in accordance with a function in response to user inputs supplied via the input device for moving the file icon corresponding to that data file from an original display position to a function-invoking position on the display that invokes the function, wherein the function-invoking position comprises a function icon displayed in a second area of the display screen, and the file icon for each of the reduced-size image/file icon pairs is displayed so that so that each file icon is between its corresponding reduced-size image and the second area of the display screen, and wherein the reduced-size image for one of the data files is fixed at a current position while a drag operation on the corresponding file icon is being performed at a predetermined speed or higher; and, when the drag speed is reduced below the predetermined speed, a frame having the size of the reduced size image is displayed.

29. The system according to claim 28, wherein the function icon and the file icons are substantially the same size.

30. A storage device for storing executable instructions for perforating steps comprising:

generating a display comprising a reduced-size image/file icon pair for each of a plurality of data files, wherein the reduced-size image/file icon pair for each of the one or more data files is displayed on a first area of a display screen, wherein the reduced-size image for each data file permits an identification of the contents of the data file and the file icon for each data file is smaller than, and spaced from, the reduced-sized image to which the file icon corresponds and wherein the display position of the file icon relative to the display position of the reduced-size image is predetermined to be the same for each of the reduced-size image/file icon pairs, and wherein the reduced-size image/file icon pair for each of the one or more data file is displayed so that the reduced-sized image and the corresponding file icon do not overlap; and processing one of the data files in accordance with a function in response to user inputs supplied via the input device for moving the file icon corresponding to that data file from an original display position to a function-invoking position on the display that invokes the function, wherein the function-invoking position comprises a function icon displayed in a second area of the display screen, and the file icon for each of the reduced-size image/file icon pairs is displayed so that so that each file icon is between its corresponding reduced-size image and the second area of the display screen, and wherein the reduced-size image for one of the data files is fixed at a current position while a drag operation on the corresponding file icon is being performed at a predetermined speed or higher; and, when the drag speed is reduced below the predetermined speed, a frame having the size of the reduced size image is displayed.

31. The storage device according to claim 30, wherein the function icon and the file icons are substantially the same size.

32. The operation method for processing data files as set forth in claim 1, wherein the one or more data files are displayed on a third area of the display screen which is opposite to the second area with the first area therebetween.

33. An image processing system comprising:

a user input device; and a processing system for generating a display for a first area of a display screen, a second area of the display screen and a third area of the display screen between the first and second areas, wherein the first area of the display screen comprises a display of icons for one or more data files, wherein the second area of the display screen comprises a display of a reduced-size image/file icon pair for each of one or more of the data files and the reduced-size image permits an identification of the contents of the data file and its corresponding concurrently displayed file icon is smaller than, and spaced from, the reduced-size image, and wherein the third area of the display screen comprises one or more function icons whose corresponding function is invoked by dropping one of the file icons thereon, wherein the file icon for a corresponding reduced-size image is displayed even if that reduced-size image does not overlap any other reduced-size image, and wherein the file icon for each of the reduced-size icon pairs is displayed so that each file icon is between its corresponding reduced-size image and the function icons in the third area of the display screen, and wherein the reduced-size image for one of the data files is fixed at a current position while a drag operation on the corresponding file icon is being performed at a predetermined speed or higher; and, when the drag speed is reduced below the predetermined speed, a frame having the size of the reduced size image is displayed.

* * * * *